(12) United States Patent
Pani et al.

(10) Patent No.: US 10,009,229 B2
(45) Date of Patent: Jun. 26, 2018

(54) POLICY VERIFICATION IN A NETWORK

(71) Applicant: Cisco Technology, Inc., San Jose, CA (US)

(72) Inventors: Ayaskant Pani, Fremont, CA (US); Ravi Raju, San Jose, CA (US); Jalajadevi Ganapathy, Sunnyvale, CA (US); Aubin Sanyal, San Jose, CA (US); Krishna Doddapaneni, Cupertino, CA (US); Sanjay Thyamagundalu, Sunnyvale, CA (US); Igino C. Cafiero, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 14/736,523

(22) Filed: Jun. 11, 2015

(65) Prior Publication Data
US 2016/0366019 A1    Dec. 15, 2016

(51) Int. Cl.
*H04L 12/26* (2006.01)
*H04L 12/24* (2006.01)
*H04L 29/06* (2006.01)

(52) U.S. Cl.
CPC .......... *H04L 41/0893* (2013.01); *H04L 43/10* (2013.01); *H04L 63/20* (2013.01); *H04L 63/101* (2013.01)

(58) Field of Classification Search
None
See application file for complete search history.

(56) References Cited

U.S. PATENT DOCUMENTS

| | | | |
|---|---|---|---|
| 8,149,730 B1* | 4/2012 | Aybay | H04L 43/50 370/253 |
| 8,248,958 B1* | 8/2012 | Tulasi | H04L 41/0866 370/241 |
| 8,789,135 B1* | 7/2014 | Pani | 370/229 |
| 8,931,046 B2 | 1/2015 | Wanser et al. | |
| 8,996,917 B1* | 3/2015 | Chandramohan | G06F 11/3696 714/26 |
| 2005/0125697 A1* | 6/2005 | Tahara | H04L 63/0227 726/4 |
| 2007/0211640 A1* | 9/2007 | Palacharla | H04L 12/2697 370/241 |
| 2008/0123536 A1* | 5/2008 | Johnson | H04L 41/145 370/241 |

(Continued)

*Primary Examiner* — Bob Phunkulh
(74) *Attorney, Agent, or Firm* — Edell, Shapiro & Finnan, LLC

(57) ABSTRACT

A determination is made at a network connected device that a network policy is to be verified. The network policy is applied to network packets sent to an endpoint within a network, and the application of the policy to network traffic can result in at least two outcomes. Another determination is made at the network connected device that a switch is provisionable to host the endpoint. The network connected device provisions a simulated endpoint version of the endpoint at the switch to host the policy. At least one packet is sent to the simulated endpoint via the network connected device for each of the at least two outcomes of the policy. At least one response is received by the network connected device from the simulated endpoint indicating how the policy was applied to each of the packets.

20 Claims, 4 Drawing Sheets

(56) References Cited

U.S. PATENT DOCUMENTS

| | | | |
|---|---|---|---|
| 2009/0225762 A1* | 9/2009 | Davidson | H04L 12/4675 370/401 |
| 2010/0027429 A1* | 2/2010 | Jorgens | H04L 12/2697 370/250 |
| 2011/0273988 A1* | 11/2011 | Tourrilhes | H04L 41/0816 370/237 |
| 2014/0348006 A1 | 11/2014 | Jain et al. | |
| 2014/0362709 A1* | 12/2014 | Kashyap | H04L 41/12 370/250 |
| 2015/0009992 A1 | 1/2015 | Zhang | |
| 2015/0138993 A1* | 5/2015 | Forster | H04L 41/12 370/248 |
| 2015/0172222 A1* | 6/2015 | Liao | H04L 49/356 370/392 |
| 2015/0188770 A1* | 7/2015 | Naiksatam | H04L 41/0893 370/254 |
| 2015/0200847 A1* | 7/2015 | Gourlay | H04L 49/70 370/392 |
| 2015/0256448 A1* | 9/2015 | Xiao | H04L 45/26 370/235 |
| 2015/0363522 A1* | 12/2015 | Maurya | H04L 43/50 703/13 |
| 2015/0365537 A1* | 12/2015 | Kahn | H04M 15/58 455/408 |
| 2016/0019044 A1* | 1/2016 | Stolarchuk | G06F 8/65 717/171 |
| 2016/0020939 A1* | 1/2016 | Ramasubramanian, Sr. | H04L 41/0654 370/217 |
| 2016/0021032 A1* | 1/2016 | Maier | H04L 49/70 370/401 |

* cited by examiner

POLICY VERIFICATION IN A NETWORK

TECHNICAL FIELD

The present disclosure relates to network policy verification.

BACKGROUND

Some modern networks group applications by virtual local area networks (VLANs) and/or virtual extensible local area networks (VXLANs) and apply connectivity and policies based on those constructs. These groupings lead to restrictions on how applications can be grouped and how policies can be applied to those applications.

According to other example networks, endpoint groups (EPGs) provide a different model for mapping applications to the network. Rather than using forwarding constructs such as addressing or VLANs to apply connectivity and policies, EPGs use a grouping of application endpoints. EPGs act as containers for collections of applications, or application components and tiers that can be used to apply forwarding and policy logic. EPGs allow the separation of network policy, security, and forwarding from addressing, and instead apply it to logical application boundaries.

DESCRIPTION OF EXAMPLE EMBODIMENTS

Overview

A determination is made at a network connected device that a network policy is to be verified. The network policy is applied to network packets sent to an endpoint within a network, and the application of the policy to network traffic can result in at least two outcomes. Another determination is made at the network connected device that a switch is provisionable to host the endpoint. The network connected device provisions a simulated endpoint version of the endpoint at the switch to host the policy. At least one packet is sent to the simulated endpoint via the network connected device for each of the at least two outcomes of the policy. At least one response is received by the network connected device from the simulated endpoint indicating how the policy was applied to each of the packets.

Example Embodiments

Figure 1:
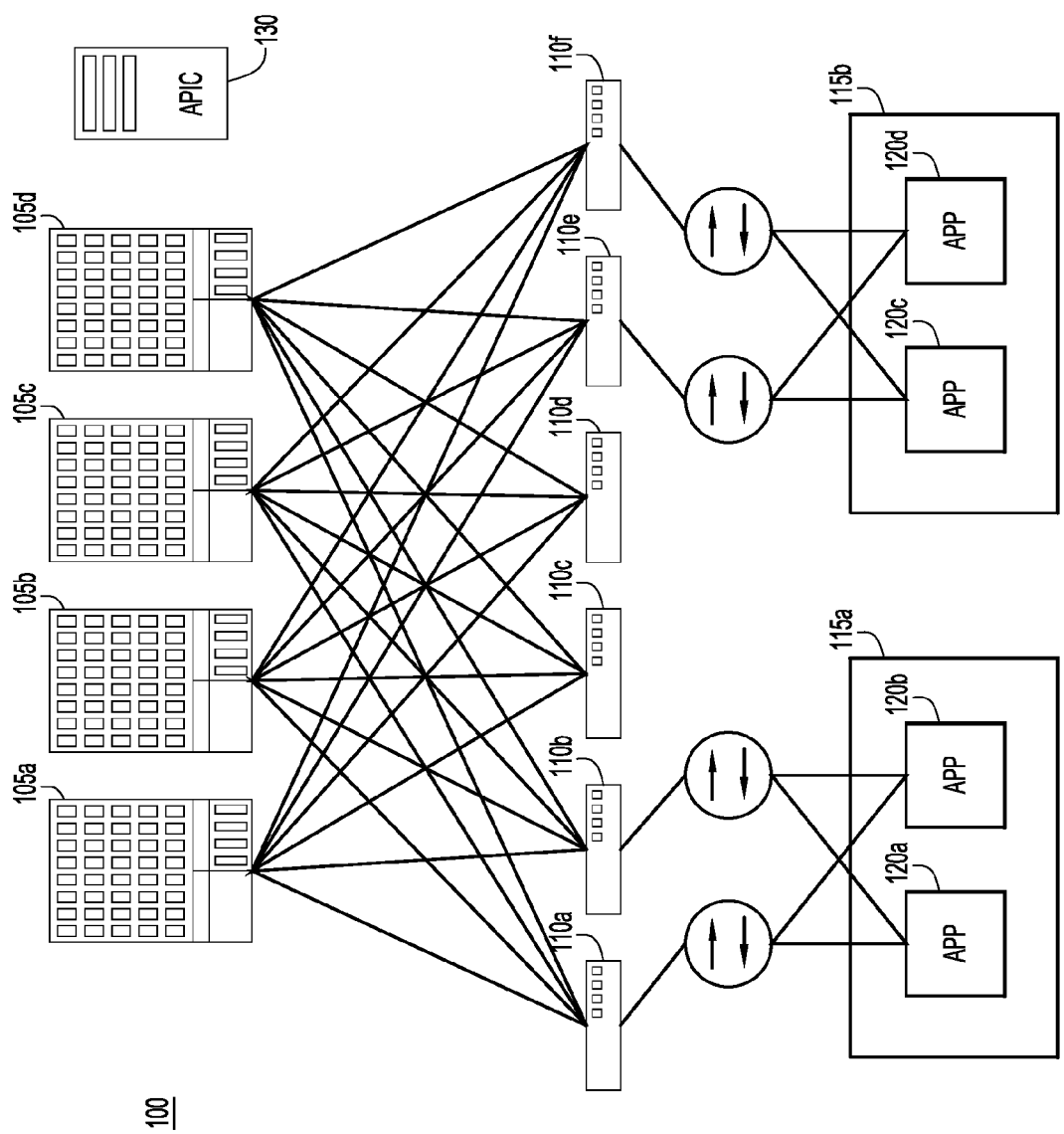
FIG. 1 is a diagram of network infrastructure of a network configured to provide policy verification, according to an example embodiment.

Depicted in FIG. 1 is a network environment 100 configured to perform policy verification, according to the techniques described herein. Specifically, network 100 includes spine switches 105-*d*, which are connected to top of rack (TOR) switches 110*a-f*. Each of TOR switches 110*a-f* is connected to endpoints, such as endpoints 115*a* and 115*b*. Endpoints 115*a* and 115*b* include applications 120*a-d*, respectively. Based upon these applications, the endpoints 115*a* and 115*b* may be logically categorized into one or more endpoint groups. For example, applications 120*a* and 120*b* may provide internet or web services, and therefore, endpoint 115*a* may be associated with a "Web Services" endpoint group. According to other example embodiments, applications 120*a* and 120*b* may provide database services, and therefore, endpoint 115*a* may be associated with a "Database" endpoint group. TOR switches 110*a-f* may be configured to apply policies to the network traffic routed to endpoints 115*a* and 115*b* based upon the endpoint groups with which endpoints 115*a* and 115*b* are associated.

Also included in network 100 is controller 130. As the arrangement of network 100 may be described as a fabric network, controller 130 may serve as a fabric controller, or in specific implementations, as an application policy infrastructure controller (APIC). Controller 130, as its name implies, controls the network devices illustrated in FIG. 1. For example, controller 130 may be responsible for provisioning and or configuring the network devices of network 100 so that the policies can be applied to network traffic. Network 100 may serve as the infrastructure for multiple tenants. For example, the infrastructure described above may serve as the underlying infrastructure for multiple Virtual Extensible Local Area Networks (VXLANs), each of which may provide network services for a different tenant.

As illustrated in FIG. 1, network 100 is a live network environment, meaning spine switches 105*a-d* and TOR switches 110*a-f* are actively routing traffic through network 100 to endpoints 115*a* and 115*b* so that polices may be applied to the live tenant traffic. Accordingly, applications 120*a* and 120*b* may be implemented on endpoint 115*a*, and policies may be applied to the network traffic directed to endpoint 115*a* by TOR switches 110*a* and 110*b*. Controller 130 acts to provision TOR switch 110*a* and endpoint 115*a* to host applications 120*a* and 120*b*. Once provisioned, packets directed to endpoint 115*a* will have the policies applied to them based upon the endpoint group with which endpoint 115*a* is associated. For example, certain polices may be applied to traffic based on the five-tuple headers of the received traffic. Specifically, policies will be applied to the network traffic according the values of the source Internet Protocol (IP) address, the destination IP address, the source port, the destination port, and the protocol of the traffic, i.e., values that make up the five tuple of the headers for the traffic.

It may also be desirable to verify that the policies are being applied and applied correctly to traffic within a production environment. For example, a network tenant and/or network infrastructure provider may want to verify that traffic is being correctly forwarded and/or dropped according to the policies for a particular endpoint group, i.e., a provider may want to verify that policies for particular applications groups are being implemented correctly. Accordingly, tenants and/or network infrastructure providers may want to be able to inject simulated network traffic, e.g., simulated network packets, into a network and verify that the packets are being accurately dropped and forwarded based on their respective five-tuple headers. In order to provide such functionality, controller 130 is configured to provide policy verification in network 100.

Specifically, controller 130 is configured to carry out the following actions in order to perform policy verification. First, the controller 130 determines all of the policies for which verification is desired. This may include determining the particular endpoint groups for which verification is to be sought, or determining the application or applications for which verification is to be sought, and then determining the policies associated with the endpoint groups and/or applications. Second, the controller 130 determines all of the TOR switches that can be provisioned to host endpoints associated with the desired endpoint groups or applications associated with the policies to be tested. Third, the controller 130 creates a simulated destination endpoint on at least one of the TOR switches to host the application associated with the policies to be tested. The controller 130 may provision the simulated destination endpoint to host the application associated with the policy or policies to be tested. Controller 130 may also create simulated source endpoints, depending on the needs of the specific verifications being performed. Next, the controller generates a packet for each possible outcome of the policy and transmits the policy to the simulated endpoint. The packet may be configured to perform a traceroute procedure so that the results of the policy application to the packet may be returned to the controller and/or source of the packet. Furthermore, a packet may be sent to the simulated endpoint for each possible source node within the network being evaluated. According to other examples, controller 130 may control simulated endpoints to generate a packet for each possible outcome of the policy. The responses from the traceroute procedure, or other methods of determining the application of the policy to the packet, are collected, and a determination is made as to whether or not the policy is being correctly applied at the simulated endpoint. Finally, the simulated endpoint may be removed from the TOR switch.

Applying these operations to network 100 may result in the following process being carried out in network 100. First, it may be determined that applications 120*a* and 120*b* of endpoint 115*a*, or the endpoint group associated with applications 120*a* and 120*b* should have their policies verified to ensure that the traffic being sent to endpoint 115*a* for applications 120*a* and 120*b* is being treated correctly. In response to this determination, controller 130 will determine which polices are applied to traffic being sent for applications 120*a* and 120*b* or the policies applied to traffic sent to the endpoint group associated with endpoint 115*a*. This determination may be based on an indication from a user, such as a network administrator, or it may be based on predetermined rules that controller 130 has been configured to operate within. Controller 130 may also determine which of TOR switches 110*a*-*f* can be configured to implement applications 120*a* and 120*b*. According to the example of FIG. 1, it is determined that in addition to TOR switches 110*a* and 110*b*, TOR switches 110*e* and 110*f* can also be configured to host applications 120*a* and 120*b*. Accordingly, at least one of TOR switches 110*a*, 110*b*, 110*e* and/or 110*f* will be provisioned to host simulated endpoint 115*b*.

According to the specific example of FIG. 1, simulated endpoint 115*b* is simulated on the switch control plane of TORs 110*e* and 110*f*. For example, the central processing unit (CPU) of TORs 110*e* and 110*f* may be provisioned to host simulated endpoint 115*b*. This differs from endpoint 115*a* which is bound to an application specific integrated circuit (ASIC) of a front panel port of TORs 110*a* and 110*b*. Though, other specific examples of the techniques described herein can host virtual endpoints, like endpoint 115*b*, on the front port ASICs in order to simulate and test behavior that would be specific to an endpoint hosted on a front panel port ASIC.

Simulated endpoint 115*b* hosts application 120*c*, which is a new instance of application 120*a*, while application 120*d* is a new instance of application 120*b*. With the simulated endpoint 115*b* and applications 120*c* and 120*d* established on the CPU of TORs 110*e* and 110*f*, controller 130 will generate packets that force TORs 110*e* and 110*f* to implement policies on the traffic. Specifically, controller 130 will generate packets whose five-tuple header values will cause TORs 110*e* and 110*f* to react to the packets in a specific way. For example, based on the values in the five-tuple headers, the packets may be dropped or forwarded by TORs 110*e* and 110*f*. Similarly, the values in the five-tuple headers of the packet may cause the packets to be forwarded to another network connected device within network 100, or forwarded to another application.

Depending on available resources, every source/destination endpoint combination may be simulated at the same time, or if placing so many simulated endpoints would negatively affect network resource availability, endpoint simulation can be performed in sequential manner.

In order to fully test a specific policy, controller 130 (or according to other examples, one or more of TOR switches 110*a*-*f*) may generate a packet for each possible outcome of the application of a policy to traffic. For example, a particular policy for traffic sent to endpoint 115*b* may have three possible states: (1) drop the traffic, (2) allow the traffic to pass through to endpoint 115*b* without monitoring, or (3) perform deep packet inspection on the traffic. Accordingly, controller 130 may generate at least three packets to test traffic sent to endpoint 115*b*: one packet that will be dropped, another packet that will pass through the firewall application without deep inspection, and a third packet that will receive deep packet inspection.

So that controller 130 can be notified about how the policies have handled the packets generated by controller 130, the packets will also be configured to perform a traceroute operation. In addition to traditional traceroute procedures in which series of packets are sent with incrementally larger time-to-live (TTL) values, controller 130 may also send traceroute packets that are configured to leverage the access control list (ACL) logging abilities of TOR switches 110*e* and 110*f*. For example, the network elements of network 100 may be pre-programmed with ACL logging rules which send copies of packets matching certain criteria to the CPU of the network elements. The manner in which these packets are treated by TOR switches 110*e* and 110*f* can then be logged by the CPU. The criteria for ACL logging may be based on the fields which are used to identify the packet as being configured to perform a traceroute function within, for example, a VXLAN, such as the inner packet's protocol type, its User Datagram Protocol (UDP) destination port and/or its TTL value. Because these packets leverage the ACL logging rules, the incremental traceroute messages can be avoiding, saving network resources.

Once the traceroute configured packets are received by the CPU of TOR 110*e* and/or TOR 110*f*, the CPU will send response messages which controller 130 may use to determine whether or not a particular policy was implemented correctly by simulated endpoint 115*b*. When the endpoint is hosted on a front panel port ASIC, the ACL logging rules may be configured to copy or mirror the test packet to the CPU for verification purposes, and for transmission of the responses to controller 130. Based on the feedback received at controller 130 from the traceroute, actions performed by the policy can be determined and any behavior that does not match the expected behavior can be flagged as an error.

The process described above can be repeated for each policy and each network connected device, such as each TOR switch 110*a*-*f*, that can be provisioned to service an endpoint hosting a particular application and/or an endpoint associated with a specific endpoint group.

Figure 2:
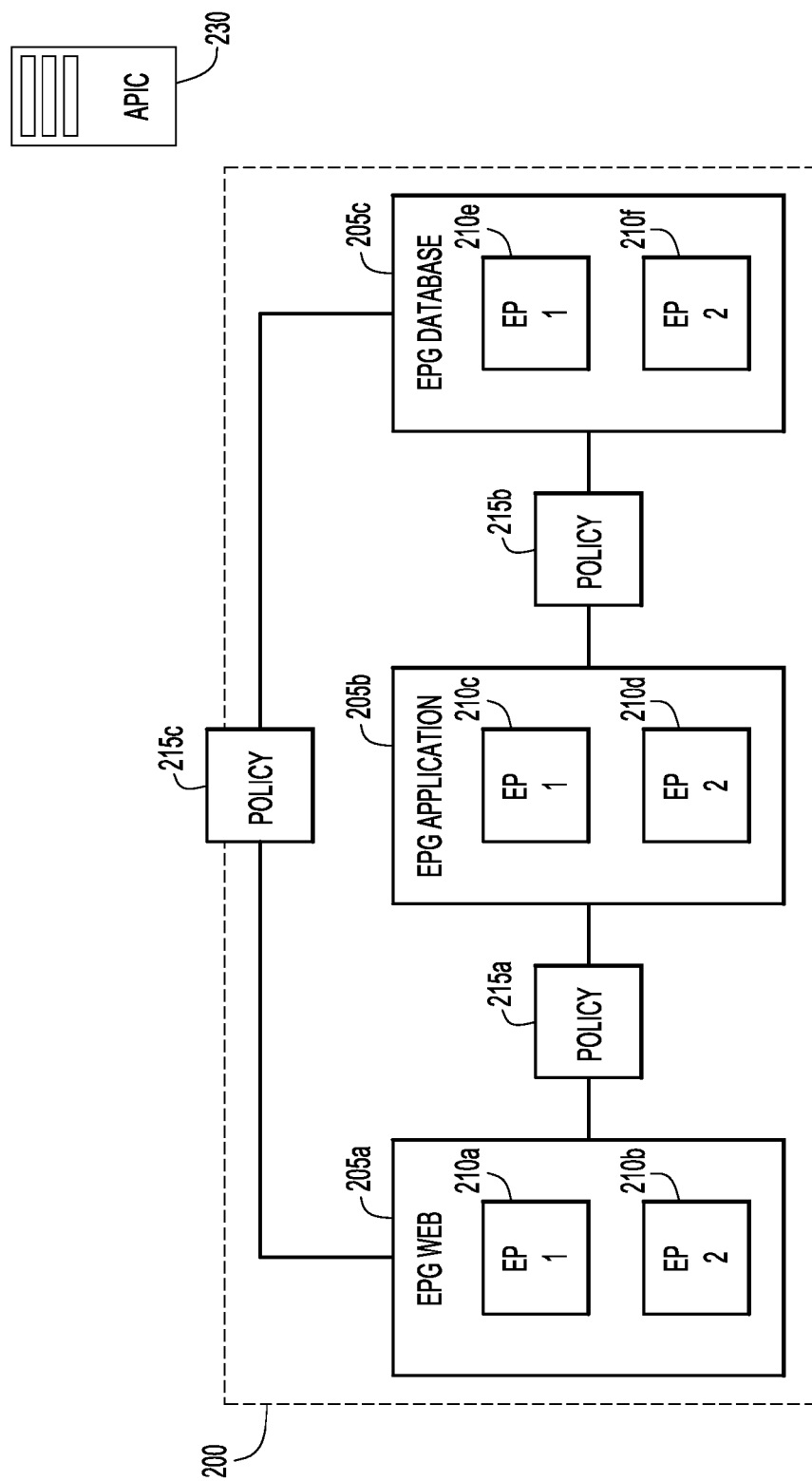
FIG. 2 is a diagram providing a logical structure view of a network configured to provide policy verification, according to an example embodiment.

The techniques described herein may be particularly applicable within networks implementing logical structures based around endpoint groups. Such an implementation will now be described with reference to FIG. 2. Depicted in FIG. 2 is a logical illustration of a network 200 which includes endpoint groups 205a-c and controller 230. Endpoint groups 205a-c are collections of similar endpoints representing an application tier or set of services. Endpoints 210a-f are defined, for example, using a network interface card (NIC), virtual NIC (vNIC), IP address, or Domain Name System (DNS) name. Endpoint groups 205a-c may also be used to represent entities such as outside networks, network services, security devices, and network storage. In other words, endpoint groups 205a-c are collections of one or more endpoints 210a-f that provide similar functions. Endpoint groups 205a-c are logical groupings with a variety of use options, depending on the application deployment model in use. Endpoint groups 205a-c may be a logical overlay over the physical infrastructure illustrated in FIG. 1.

Endpoint groups 205a-c provide a logical grouping of objects that require similar policies. According the specific example of FIG. 2, endpoint group 205a provides the web tier for network 200, while endpoint group 205b is an application endpoint group and endpoint group 205c is a database endpoint group. Accordingly, Internet services endpoints 210a and 210b are logically grouped into endpoint group 205a, application services endpoints 210c and 210d are grouped into endpoint group 205b and databases services endpoints 210e and 210f are grouped into endpoint group 205c. In other words, endpoints 210a-f are grouped into endpoint groups 205a-c based on similar functions, and therefore, the polices applied to traffic sent to endpoints 210a-f may also be the same based on which of endpoint groups 205a-c the traffic was sent from. Accordingly, polices 215a-c are logically arranged between the respective endpoint groups 205a-c.

Tenants and infrastructure providers may want a way to ensure that a given logical endpoint group policy is applied in hardware properly. In order to provide this, the techniques described above with reference to FIG. 1 can be applied to networks with logical endpoint group overlays, like that of FIG. 2. Specifically, the process of testing the policies may take the form of the following steps that may be carried out by controller 230:

1. For a given endpoint group policy, determine the TOR switches on which source endpoints can be present. For example, when verifying policy 215a, all of the TORs on which endpoint 210c and/or endpoint 210d may be present are determined. This information may be easily derived from the fabric configuration of the network.
2. For the given endpoint group policy, determine the TOR switches on which destination endpoints can be present. For example, when verifying policy 215a, all of the TORs in which endpoints 210a and/or 210b may be present are determined. This information may be easily derived from the fabric configuration.
3. Anchor the destination endpoints on the destination TORs identified in step 2. The anchoring of the destination endpoints may include creating destination static endpoints and hosting the endpoint on the switch control plane. The endpoints may be reserve or simulated endpoints, meaning they will not receive live traffic so as to minimize the impact on real endpoints during verification. When reserve endpoints are used, the network may be configured with a plurality of pre-reserved switches that are specifically used for policy verification. The anchoring step may also entail creating logging rules to capture packets matching flows between various source and destination endpoints. The logging rules may take the form of ACL rules, Switch Port Analyzer (SPAN) rules, Remote SPAN (RSPAN) rules, and/or Encapsulated Remote SPAN (ERSPAN) rules.
4. Simulate traffic by triggering flow based traffic to be sent from the source TOR switch to the destination TOR switch. For example, for each policy for a given pair of source and destination endpoint groups, traffic flows are simulated. The flows are based on policy rules. If a policy rule is "Allow TCP port-80 traffic between endpoint group 205b to endpoint group 205a," then a set of representative or simulated destination endpoints are placed on destination TOR switches and flows are created which have source and destination endpoint addresses matching endpoint group 205b and endpoint group 205a, respectively. The flows should also test matching and non-matching flow conditions. Accordingly, the flows would include port 80 traffic between endpoint group 205b and endpoint group 205a, as well as port 80 traffic to endpoint group 205a from other sources.
5. Receive responses of the results of the application of the policy to the simulated traffic. For example, ERSPAN traffic may be analyzed by controller 230 to determine if flows are adhering to the policy rules. Specifically, if a flow should have been allowed, ERSPAN traffic should include the EPSPAN copy of the flow from the egress port. On the other hand, if a flow should not have been allowed, the ERSPAN traffic should not include a copy of the traffic. A sequential filter mechanism may be utilized to determine the expected result for the flow.

The above steps may be repeated for each rule in the given policy set for the source endpoint group/destination endpoint group pair. Furthermore, the source and destination endpoints may be distributed over all of the possible TOR switches, and verification steps described above may be carried out for each pair of TOR switches.

Figure 3:
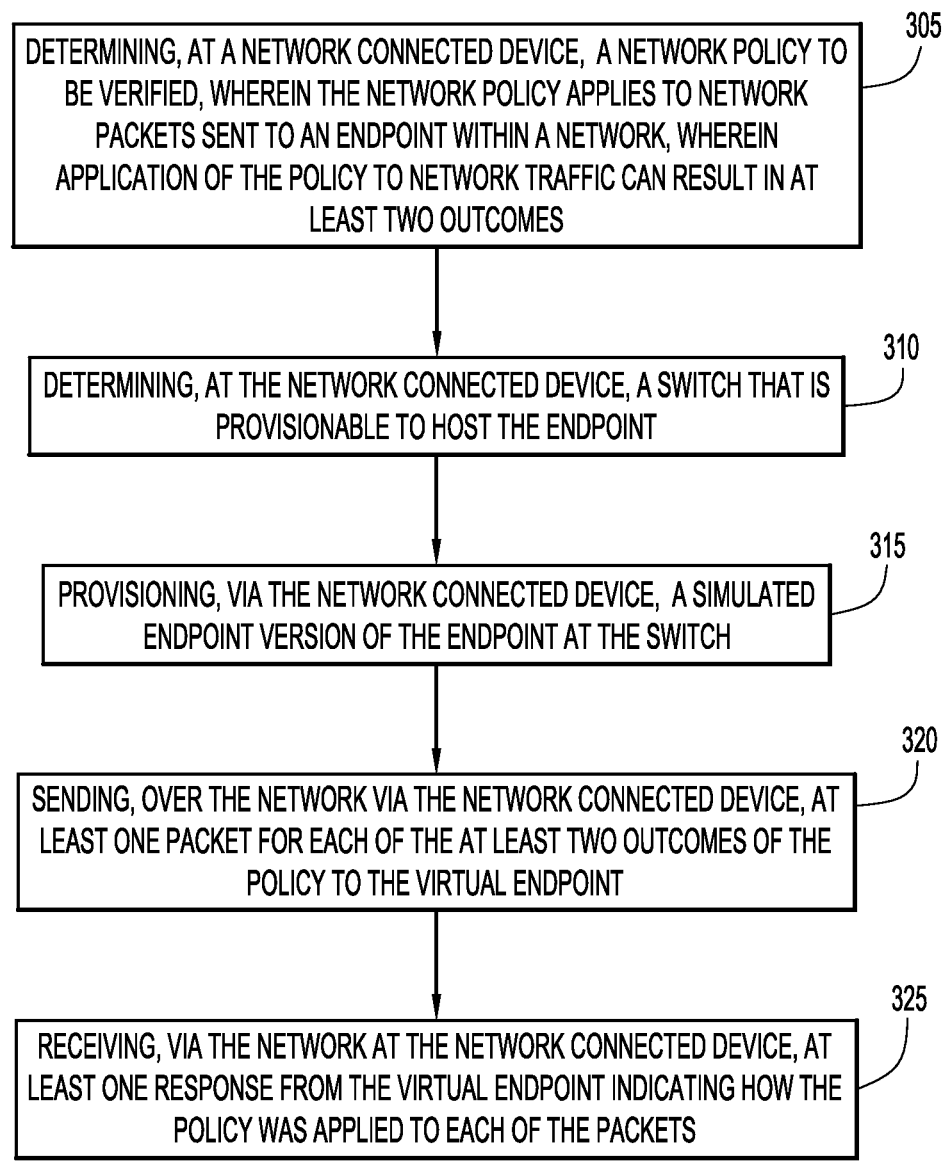
FIG. 3 is a flowchart illustrating a process for providing policy verification in a network, according to an example embodiment.

With reference to FIG. 3, depicted therein is flowchart 300 illustrating a process for verifying policies according to the techniques described herein. The process begins in 305 where a network policy to be tested is determined. The network policy may be applied to network packets sent to an endpoint within a network. For example, the network policy may include a policy to apply between two endpoints, each within an endpoint group of a logical overlay of a network. The policy may also include at least two possible outcomes, such as allowing or dropping traffic based on certain criteria.

In 310, a TOR switch is determined to be provisionable (i.e., can be provisioned) to host the endpoint. For example, this may involve determining which TOR switches can host a particular endpoint providing an application that that requires the implementation of the policy being verified. According to other examples, this may involve determining a TOR switch that can host an endpoint associated with an endpoint group that requires the implementation of the policy.

In 315, the TOR switch is provisioned to simulate an endpoint that requires application of the policy. As described above, the provisioning of the TOR switch can include provisioning the TOR switch to host the endpoint within its control plane, on its CPU, or on a front panel port ASIC of the TOR switch.

In 320, at least one packet is sent to the simulated endpoint for each of the two possible outcomes of the policy.

Finally, in 325, at least one response is received from the virtual endpoint indicating how the policy was applied to each of the packets.

The operations of flowchart 300 may be carried out by a controller, such as controller 130 of FIG. 1 or controller 230 of FIG. 2. According to other examples, the controller may send messages to have individual TOR switches carry out one or more of the elements of flowchart 300. For example, the sending of the packets to the simulated endpoint may take place directly from the controller, or the controller may control one or more TOR switches to carry out the sending of the packets.

Figure 4:
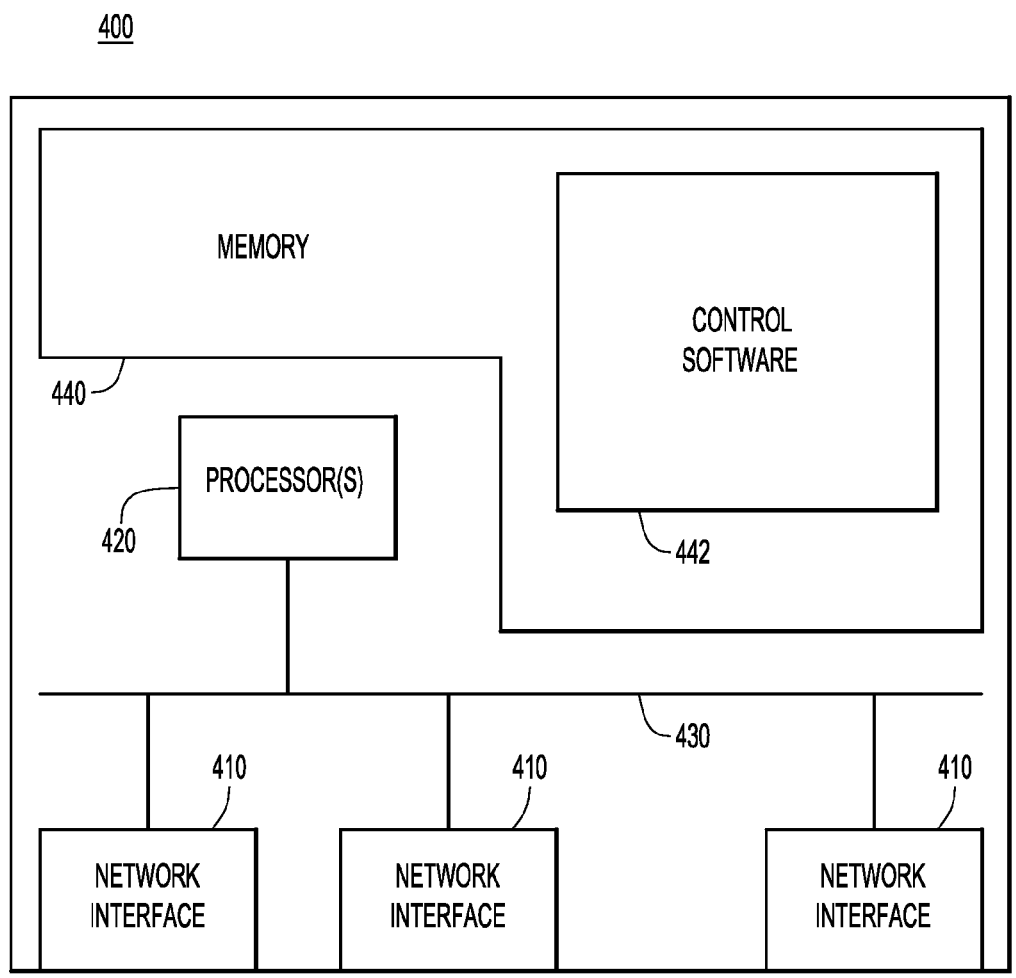
FIG. 4 is a block diagram of a device configured to carry out policy verification in a network, according to an example embodiment.

With reference now made to FIG. 4, an example block diagram is shown of a device 400, and device 400 may be any one of a TOR switch, a spine switch, or a controller, described above with reference to FIGS. 1-3. Accordingly, device 400 is configured to perform the techniques described herein. Device 400 includes network interfaces (e.g., network ports) 410 which may be used to receive and send packets over a network. Accordingly, network interfaces 410 may be embodied as a wired interface, a wireless interfaces, an optical interface, an electrical interface, or a combination thereof. One or more processors (the aforementioned CPU) 420 are provided to coordinate and control device 400. The processor 420 is, for example, one or more microprocessors or microcontrollers, and it communicates with the network interfaces 410 via bus 430. Memory 440 stores software instructions 442 which may be executed by the processor 420. For example, control software 442 for device 400 includes instructions for performing the policy verification described above with reference to FIGS. 1-3. In other words, memory 440 includes instructions for device 400 to carry out the operations described above in connection with FIGS. 1-3.

Memory 440 may include read only memory (ROM), random access memory (RAM), magnetic disk storage media devices, optical storage media devices, flash memory devices, electrical, optical or other physical/tangible (e.g. non-transitory) memory storage devices. Thus, in general, the memory 440 may be or include one or more tangible (non-transitory) computer readable storage media (e.g., a memory device) encoded with software comprising computer executable instructions. When the instructions of the control software 442 are executed (by the processor 420), the processor is operable to perform the operations described herein in connection with FIGS. 1-3.

In summary, presented herein are methods for policy verification in a network in which a determination is made at a network connected device that a network policy is to be verified. The network policy is applied to network packets sent to an endpoint within a network, and the application of the policy to network traffic can result in at least two outcomes. Another determination is made at the network connected device that a switch (e.g., a TOR switch) is provisionable to host the endpoint. The network connected device provisions a simulated endpoint version of the endpoint at the switch. At least one packet is sent to the simulated endpoint via the network connected device for each of the at least two outcomes of the policy. At least one response is received by the network connected device from the simulated endpoint indicating how the policy was applied to each of the packets.

In another form, an apparatus is provided that includes one or more processors and network interfaces for policy verification in a network. The processor determines that a network policy is to be verified. The network policy is applied to network packets sent to an endpoint within a network, and the application of the policy to network traffic can result in at least two outcomes. The processor further determines that a switch is provisionable to host the endpoint. The processor provisions a simulated endpoint version of the endpoint at the switch. At least one packet is sent by the processor over the network interface to the simulated endpoint for each of the at least two outcomes of the policy. At least one response is received by the processor via the network interface from the simulated endpoint indicating how the policy was applied to each of the packets.

In still another form, a non-transitory computer readable storage media is provided that is encoded with software instructions, that when executed by a processor, cause the processor to determine that a network policy is to be verified. The network policy is applied to network packets sent to an endpoint within a network, and the application of the policy to network traffic can result in at least two outcomes. The instructions cause the processor to further determine that a switch is provisionable to host the endpoint. According to the instructions, the processor provisions a simulated endpoint version of the endpoint at the switch. The instructions cause the processor to send at least one packet over a network interface to the simulated endpoint for each of the at least two outcomes of the policy. The instructions further cause the processor to receive via the network interface at least one response from the simulated endpoint indicating how the policy was applied to each of the packets.

Accordingly, the techniques described herein, by placing simulated endpoints on the switches through the use of traceroute and/or ERSPAN in conjunction with simulated flows, allow for end to end flow forwarding behavior analysis and consistency checks for programmed policies. The techniques described herein provide an automated way of verifying policies in hardware. The verification can be performed with a high degree of confidence using multiple flows across multiple source and destination tors.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
determining, at a controller network connected device, a network policy to be verified, wherein the network policy is applied to network packets sent to an endpoint within a network, wherein application of the policy to network traffic can result in at least two outcomes, and wherein the policy is applied at a switch associated with the endpoint;
determining, at the controller network connected device, that the switch is provisionable to host the endpoint;
provisioning, via the controller network connected device, a virtual endpoint at the switch by provisioning the switch to host the virtual endpoint on a switch control plane of the switch or by provisioning the switch to host the virtual endpoint on an application specific integrated circuit of a front panel port of the switch;
sending, over the network via the controller network connected device, at least one packet for each of the at least two outcomes of the policy to the virtual endpoint;

receiving, via the network at the controller network connected device, at least one response from the virtual endpoint indicating how the policy was applied to each of the packets; and comparing, at the controller network connected device, how the policy was applied to each of the packets with the at least two outcomes to determine if the policy is correctly applied by the switch.

2. The method according to claim 1, wherein the controller network connected device comprises an application infrastructure controller.

3. The method of claim 1, wherein the controller network connected device comprises a fabric network controller.

4. The method of claim 1, further comprising pre-reserving a plurality of switches for policy verification, and wherein determining the switch that is provisionable to host the endpoint comprises selecting at least one of the plurality of switches.

5. The method of claim 1, wherein sending the at least one packet for each of the at least two outcomes of the policy comprises a sending a traceroute packet for each of the at least two outcomes, and wherein receiving the at least one response comprises receiving at least one response for each of the traceroute packets.

6. The method of claim 1, wherein sending at least one packet for each of the at least two outcomes of the policy comprises configuring a five-tuple header of at least one packet to induce application of the policy to the packet.

7. The method of claim 1, wherein hosting the virtual endpoint on the switch control plane comprises hosting the virtual endpoint on a switch central processing unit.

8. The method of claim 1, wherein receiving the at least one message comprises receiving Access Control List logging messages.

9. The method of claim 1, wherein the network comprises a production environment network.

10. The method of claim 1, wherein the policy is applied to traffic sent to endpoints of an endpoint group.

11. An apparatus comprising:
a network interface configured to send network packets over a network; and
a processor, wherein the processor is configured to:
determine a network policy to be verified, wherein the network policy is applied to network packets sent to an endpoint within the network, wherein application of the policy to network traffic can result in at least two outcomes, and wherein the policy is applied at a switch associated with the endpoint;
determine that the switch is provisionable to host the endpoint;
provision a virtual endpoint at the switch by provisioning the switch to host the virtual endpoint on a switch control plane of the switch or by provisioning the switch to host the virtual endpoint on an application specific integrated circuit of a front panel port of the switch;
send, via the network interface, at least one packet for each of the at least two outcomes of the policy to the virtual endpoint;
receive, via network interface, at least one response from the virtual endpoint indicating how the policy was applied to each of the packets; and
compare how the policy was applied to each of the packets with the at least two outcomes to determine if the policy is correctly applied by the switch.

12. The apparatus of claim 11, wherein the processor is configured to send the at least one packet for each of the at least two outcomes of the policy by sending a traceroute packet for each of the at least two outcomes.

13. The apparatus of claim 11, wherein the processor is configured to send the at least one packet for each of the at least two outcomes of the policy by configuring a five-tuple header of at least one packet to induce application of the policy to the packet.

14. The apparatus of claim 11, wherein the processor is configured to provision the switch to host the virtual endpoint on the switch control plane by provisioning the switch to host the virtual endpoint on a switch central processing unit.

15. The apparatus of claim 11, wherein the apparatus comprises an application infrastructure controller.

16. The apparatus of claim 11, wherein the apparatus comprises a fabric network controller.

17. A non-transitory computer readable storage media encoded with instructions, wherein the instructions, when executed by a processor, cause the processor to:
determine, at a controller network connected device, a network policy to be verified, wherein the network policy is applied to network packets sent to an endpoint within a network, wherein application of the policy to network traffic can result in at least two outcomes, and wherein the policy is applied at a switch associated with the endpoint;
determine, at the controller network connected device, that the switch is provisionable to host the endpoint;
provision, at the controller network connected device, a virtual endpoint at the switch by provisioning the switch to host the virtual endpoint on a switch control plane of the switch or by provisioning the switch to host the virtual endpoint on an application specific integrated circuit of a front panel port of the switch;
send, over the network via the controller network connected device, at least one packet for each of the at least two outcomes of the policy to the virtual endpoint;
receive, via network at the controller network connected device, at least one response from the virtual endpoint indicating how the policy was applied to each of the packets; and
compare, at the controller network connected device, how the policy was applied to each of the packets with the at least two outcomes to determine if the policy is correctly applied by the switch.

18. The non-transitory computer readable storage media of claim 17, wherein the instructions cause the processor to send the at least one packet for each of the at least two outcomes of the policy by sending a traceroute packet for each of the at least two outcomes.

19. The non-transitory computer readable storage of claim 17, wherein the instructions cause the processor to send the at least one packet for each of the at least two outcomes of the policy by configuring a five-tuple header of at least one packet to induce application of the policy to the packet.

20. The non-transitory computer readable storage of claim 17, wherein the instructions cause the processor to provision the switch to host the virtual endpoint on the switch control plane by provisioning the switch to host the virtual endpoint on a switch central processing unit.

* * * * *